US010900812B2

(12) United States Patent
Psiuk et al.

(10) Patent No.: US 10,900,812 B2
(45) Date of Patent: Jan. 26, 2021

(54) METHOD, APPARATUS AND COMPUTER PROGRAM FOR DETERMINING INFORMATION ON A POSITION OF AN OBJECT, THE OBJECT EMITTING A MAGNETIC FIELD

(71) Applicant: FRAUNHOFER-GESELLSCHAFT ZUR FOERDERUNG DER ANGEWANDTEN FORSCHUNG E.V., Munich (DE)

(72) Inventors: Rafael Psiuk, Erlangen (DE); Markus Hartmann, Sulzbach-Rosenberg (DE); Tobias Draeger, Baiersdorf (DE); Jørn Eskildsen, Torring (DK)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 60 days.

(21) Appl. No.: 16/328,757

(22) PCT Filed: Aug. 31, 2017

(86) PCT No.: PCT/EP2017/071930
§ 371 (c)(1),
(2) Date: Feb. 27, 2019

(87) PCT Pub. No.: WO2018/077514
PCT Pub. Date: May 3, 2018

(65) Prior Publication Data
US 2019/0195658 A1 Jun. 27, 2019

(30) Foreign Application Priority Data
Oct. 24, 2016 (DE) .................. 10 2016 120 246

(51) Int. Cl.
G01D 5/20 (2006.01)
A63B 71/06 (2006.01)
(Continued)

(52) U.S. Cl.
CPC ........... *G01D 5/20* (2013.01); *A63B 24/0021* (2013.01); *A63B 63/004* (2013.01);
(Continued)

(58) Field of Classification Search
CPC ... G01V 3/18; G01V 1/52; G01V 3/34; G01V 3/38; G01V 5/04; E21B 47/00; E21B 4/02; E21B 7/062
(Continued)

(56) References Cited

U.S. PATENT DOCUMENTS 4,072,200 A * 2/1978 Morris ................ E21B 47/0228
175/45
4,933,640 A * 6/1990 Kuckes .................... G01V 3/28
324/339
(Continued)

FOREIGN PATENT DOCUMENTS

DE 102013214283 A1 1/2015
DE 102014200038 A1 7/2015
(Continued)

OTHER PUBLICATIONS

Allison William Magill Wade: "An elemental magnetic dipole" In: "Fundamental Physics for Probing and Imaging", Jan. 1, 2006, Oxford University Press, Oxford.

*Primary Examiner* — Giovanni Astacio-Oquendo
(74) *Attorney, Agent, or Firm* — 2SPL Patent Attorneys PartG mbB; Kieran O'Leary

(57) ABSTRACT

A method for determining information on a position of an object, the object emitting a magnetic field in response to an exciting electromagnetic field comprises monitoring (100) a
(Continued)

receive signal of at least one loop antenna, the receive signal having a contribution caused by the emitted magnetic field; determining a first quadrature component (102) of the receive signal; and determining the information on the position of the object (104) based on the first quadrature component.

20 Claims, 5 Drawing Sheets

(51) Int. Cl.
*A63B 63/00* (2006.01)
*G01S 13/75* (2006.01)
*G01S 13/06* (2006.01)
*A63B 24/00* (2006.01)

(52) U.S. Cl.
CPC .......... *A63B 71/0605* (2013.01); *G01S 13/06* (2013.01); *G01S 13/75* (2013.01); *A63B 2024/0037* (2013.01); *A63B 2225/54* (2013.01)

(58) Field of Classification Search
USPC .................. 324/346, 333, 334, 338, 339
See application file for complete search history.

(56) References Cited

U.S. PATENT DOCUMENTS

| | | | | |
|---|---|---|---|---|
| 2002/0062992 | A1* | 5/2002 | Fredericks | G01V 1/52 175/40 |
| 2005/0083061 | A1* | 4/2005 | Tabanou | G01V 3/28 324/334 |
| 2005/0104596 | A1* | 5/2005 | Fleury | G01N 27/02 324/376 |
| 2011/0298451 | A1* | 12/2011 | Sterling | H03M 1/06 324/207.21 |

FOREIGN PATENT DOCUMENTS

| | | |
|---|---|---|
| EP | 2814114 A1 | 12/2014 |
| WO | 2013149649 A2 | 10/2013 |

* cited by examiner

METHOD, APPARATUS AND COMPUTER PROGRAM FOR DETERMINING INFORMATION ON A POSITION OF AN OBJECT, THE OBJECT EMITTING A MAGNETIC FIELD

BACKGROUND

Embodiments relate to a method for determining information on a position of an object which emits a magnetic field.

Applications, where objects are monitored with respect to their movement and position are numerous, as for example in sports games. Sports games, such as for example soccer, football, handball, ice hockey, hockey or the like employ rules where one participating party scores when an object, such as a ball or the like, crosses a predetermined detection plane, as for example the open front face of a goal in soccer. The information, whether the ball completely passed the plane bordering the goal is essential to conclude whether the score has been achieved or not. Traditionally, that decision has been taken by a referee from a visual observation. Especially in scenarios where the ball moves into the direction of the goal and is returned quickly by the goal keeper, it may be difficult to determine, whether the ball entered completely into the goal, which is whether the ball moved completely through the detection plane. For example, in sports games, it may, therefore, be of interest to determine information on the position of a ball, a puck or other sports equipment, be it relative with respect to another item or participant of the sports game or be it in absolute coordinates.

There exist some approaches to determine the object's position. Apart from camera-based optical systems, some approaches propose to detect the transition of the ball through a detection plane, e.g. the plane defined by the goal line, using electromagnetic fields and/or signals derived therefrom. Some proposed systems provide magnetic fields of different direction on opposite sides of the detection plane together with sensors within the object or the ball under observation. That is, a sensor within the object monitors the magnetic field and actively determines that it passed through the detection plane when the orientation of the magnetic field has changed. In that event, the object or a sender contained therein transmits the information that the object detected transition through the detection plane to a receiver circuit such as to be able to indicate whether the ball was fully inside the volume of the goal or not.

Other systems utilize two antenna loops on each side of the detection plane, wherein each antenna loop receives a high-frequency signal with opposite phase such as to provide magnetic fields cancelling each other out in the detection plane in the middle between the two loops. A third receive antenna loop is deployed at this position in order to receive the field disturbance of an object passing through the set-up such as to be able to conclude, on occurrence of a signal on the receive antenna loop, that a ball or an object passed the plane of the receive antenna loop.

In order to provide or to receive the magnetic field used for the detection, those systems utilize antenna loops fully encircling the area of interest within the detection plane, such as for example the open mouth of a soccer goal in order to provide a field of precisely predetermined geometry. By relying on the precise generation of a magnetic field of predetermined geometry, in particular with respect to the detection plane where a disappearing magnetic field is required, those systems suffer from a decreased spatial resolution, since the generation of such a precise field configuration over large areas is hardly feasible. Further, those conventional systems are sensitive to disturbances of the electromagnetic field which may, for example, be caused by items of conductive material, which can be excited to generate a magnetic field. Generally, disturbing objects that have the capability to also emit a magnetic field may disturb or prevent the generation of the information on the position of the object of interest.

That is, there is a desire to provide a method for determining information on a position of an object being more robust.

SUMMARY

An embodiment of a method for determining information on a position of an object, the object emitting a magnetic field in response to an exciting electromagnetic field, comprises monitoring a receive signal of at least one loop antenna, the receive signal having a contribution caused by the emitted magnetic field. The method further comprises determining a first quadrature component of the receive signal. The information on the position of the object is determined based on the first quadrature component. In using the quadrature component of the receive signal, signal contributions of disturbing objects can be suppressed or even eliminated, which predominantly contribute to the in-phase component of the receive signal.

Some embodiments comprise determining the first quadrature component of the receive signal at a first frequency and determining a second quadrature component of the receive signal at a second frequency, while the information on the position of the object is determined using the first quadrature component and the second quadrature component. By using two different frequencies, signal contributions of disturbing objects may be suppressed to a greater extent in applications where the signal contribution of the object is big at one of the first or the second frequencies while it is small at the other frequency so that equal signal contributions of disturbing objects at both frequencies can be compensated.

Some embodiments comprise determining a change of the corrected quadrature component as wells as compensating the change of the corrected quadrature component if a characteristic of the corrected quadrature component fulfills an error correction criterion. If a change of the quadrature component is compensated while an error correction criterion indicates that the change is not caused by a signal emitted by the object, long term deviations from stable operating conditions, caused for example by temperature or other environmental changes, may be considered and corrected for. This may enable stable operating conditions resulting with good positioning results over extended periods of time, also at varying operating conditions.

BRIEF DESCRIPTION OF THE FIGURES

Some embodiments of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

FIGS. 1 to 4 illustrate an example of an antenna system that may be used to determine information on a position of a ball with respect to a soccer goal to illustrate the principles allowing to determine information on a position of an object that emits a magnetic field. However, this application is to be understood as one particular example only since various other applications may use an embodiment of a method for determining information on a position of an object.

Figure 1:
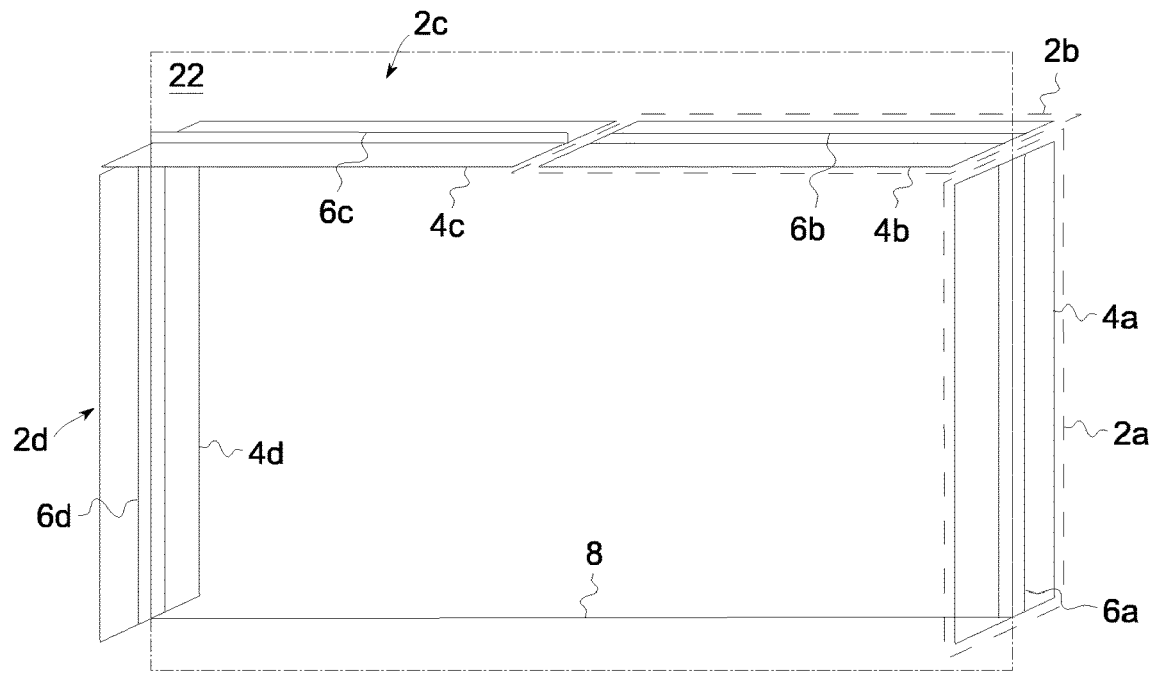
FIG. 1 shows a schematic view of a goal of a soccer field having mounted thereto an antenna system for monitoring signals caused by an object emitting a magnetic field.

FIG. 1 shows a schematic view of a goal, e.g. of a soccer game, having mounted thereto four antenna systems 2a-d. Although the goal is enclosed by four antenna systems in FIG. 1, further examples may also utilize different amounts of antenna systems. For example, in a further example, only one antenna system may be used, either at one of the posts of the goal or at the top bar of the goal. In the example of FIG. 1, the antenna system serves to determine the transit of a ball through the detection plane defined by the goal line. In the configuration of FIG. 1, the detection plane is the plane perpendicular to loop antennas 4a-d of the antenna systems 2a-d and, therefore, parallel to the open front face of the goal.

As elaborated on in the following description of FIGS. 2 to 6, the loop antennas 4a-d are the antennas used for the detection of the crossing or of the transit of the ball 11 through the detection plane. Therefore, the loop antennas 4a-d may also be denoted as goal line antennas. While the following simple examples will mainly address the crossing of the detection plane, the embodiments using the receive signals of the loop antennas may also derive more elaborate information on the position of the ball. For example, some embodiments may determine the coordinate of the ball using, for example, a fingerprinting technique where an expected quadrature component of the receive signal for various positions of the ball is—for each of the loop antennas—compared to the received quadrature component to conclude on the position of the ball.

The example of FIG. 1 further comprises a further loop antenna 6a-d in each of the antenna systems 2a-d, which comprises one or more antenna loops arranged only within a further antenna plane which is perpendicular to the antenna plane of the loop antennas 4a to 4d and parallel to the detection plane 22. These further loop antennas may serve to derive information whether the ball passed through the detection plane 22 inside the goal or outside of the goal. Therefore, the further loop antennas 6a-d may also be denoted as frame antennas. In other words, the frame antennas serve to define an area of interest within the detection plane, in order to be able to conclude, whether the ball crossed the detection plane within the area of interest. Therefore, the further loop antennas 6a-d are situated at the border of the area of interest, that is, at the goal posts. Alternatively, the area of interest may be determined using the loop antennas 4a-4d together with a fingerprinting technique.

Figure 2:
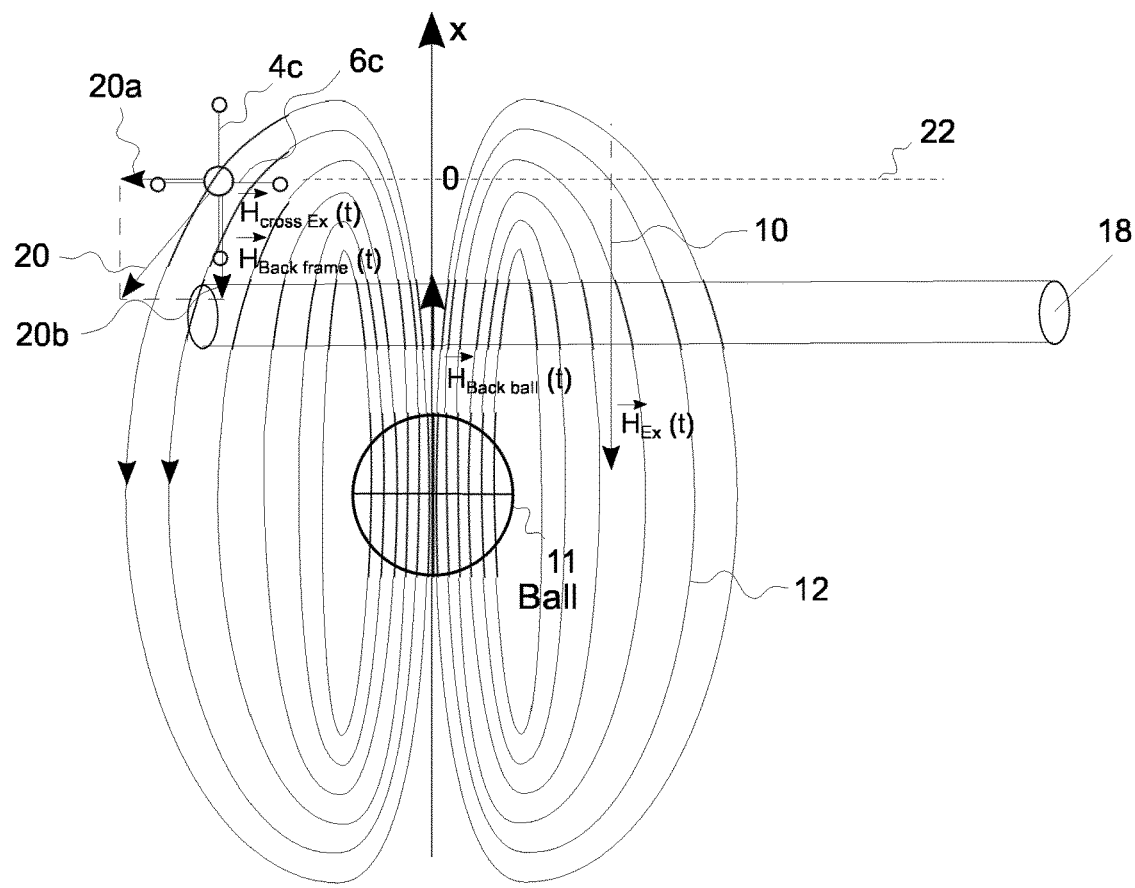
FIG. 2 shows a sideview of a section of the antenna system as attached to the goal.

FIG. 1 further illustrates schematically a ground loop signal path 8, which serves to connect first and second terminals of the loop antennas 4a-d such as to close a conductive loop in order to generate an exciting electromagnetic field as illustrated in FIG. 2. That is, the ground loop signal path 8 closes the electrical circuit in order to enable the generation of the exciting electromagnetic field with the loop antennas 2a-d.

Although the example illustrated in FIG. 1 utilizes the loop antennas 4a-d to also generate the exciting electromagnetic field by applying an excitation signal to said loop antennas 4a-4d, further examples may utilize a separate excitation loop in order to provide the exciting electromagnetic field. According to some examples, the separate excitation loop extends through the center of the loop antennas 4a-4d.

In the following, the operating principles of the antenna system and of the determination of the presence of a crossing or of a transit of an object through the area of interest within the detection plane 22 will be explained together with the discussion of FIGS. 2 to 6.

With the antenna system, an exciting electromagnetic field is generated that has filed lines of the magnetic component that cross the detection plane 22 essentially perpendicular to the detection plane 22. The exciting electromagnetic field 10 or, to be more precise, its magnetic component is only illustrated schematically by indicating the direction of a single field line 10 in FIG. 2.

Utilizing an object 11 emitting a magnetic field 12 as illustrated in FIG. 2, the magnetic component 12 of the electromagnetic field is received by means of the loop antennas 4a-d. FIG. 2 assumes the object 11 to be a ball of sports game which emits the magnetic field 12 as illustrated by the shown field lines. This may in principle be achieved by using an object 11 or a ball which is actively sending a magnetic field 12.

Figure 10:
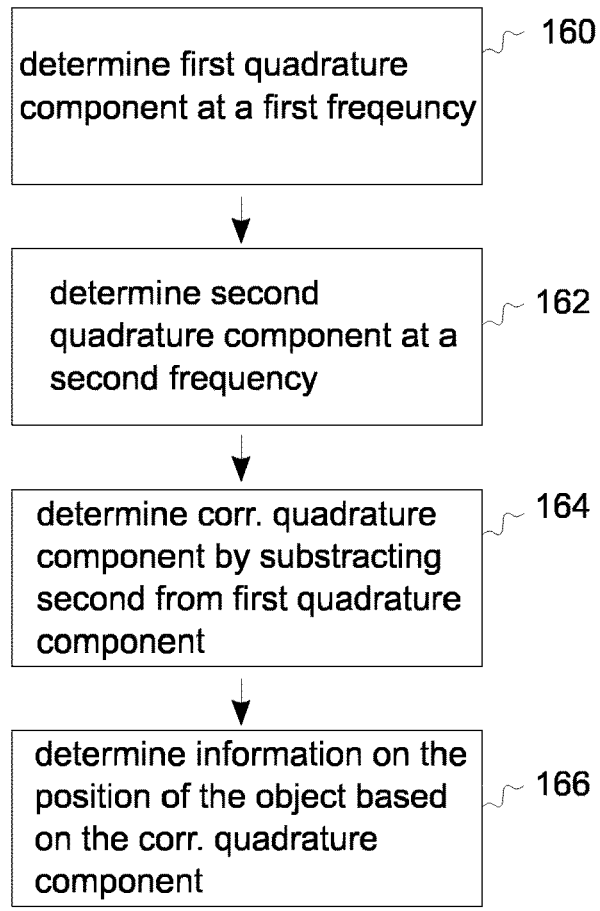
FIG. 10 illustrates a flowchart of further optional steps of the method for determining information on a position of the object.

The examples described in the Figs, however, utilize a ball 11 or an object which is excited by the exciting electromagnetic field 10 as generated by the loop antennas 4a-d to emit the magnetic field 12. To this end, a ball or object 11 as shown in FIG. 10, left illustration, may be utilized, which comprises three loop antennas 14a-c being arranged in a pairwise perpendicular orientation with respect to each other. The three loop antennas 14a-c are connected in series with each other and with a resonator or oscillation circuit 16, the resonator 16 having a resonance frequency corresponding essentially to a first frequency of the exciting electromagnetic field 10. That is, the object comprises three perpendicular coils 14a-c with a resonance frequency corresponding to the first frequency of the exciting electromagnetic field 10. When such a ball or object 11 approaches the goal or the antenna system 2a-d, the coils 14a-c inside the ball 11 are stimulated by the exciting electromagnetic field 10. That is, a current is induced in the loop antennas 14a-c. Due to the resonance frequency of the resonator of the object 11 and the corresponding frequency of the exciting electromagnetic signal 10, the received energy is stored in the resonant circuit or in the resonator 16 of the object, e.g. in a capacitor used therein. The oscillation in the resonator or the stored energy is then generating a magnetic field in the coils 14a-c of the object 11 itself, having field lines 12 with a direction opposite to the direction of the field lines of the exciting electromagnetic field 10.

According to further examples, the object may also comprise three loop antennas or coils 14a-c which are being arranged in a pairwise perpendicular orientation with respect to each other and which are not connected in series, as indicated by the right illustration in FIG. 10. Each loop antenna or coil 14a-c is part of an independent resonator which further comprises an associated capacitance 16a-c being connected in series or in parallel. Each of the three so provided resonant circuits may be tuned to the frequency of the exciting electromagnetic field 10 by choosing the capacitances and the inductances of the loops of each circuit appropriately. Other embodiments, however, may use different resonance frequencies for each of the independent resonators to be able to distinguish the individual coils and to so determine information on an orientation of the ball.

Figure 3:
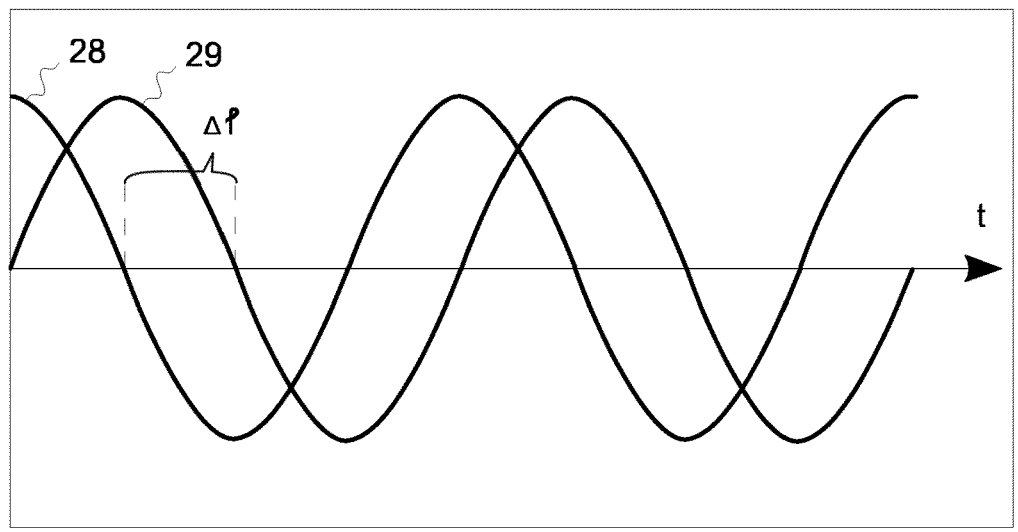
FIG. 3 shows an example of idealized signal characteristics of an excitation signal used to make the object emit a magnetic field and the receive signal caused by the emitted magnetic field.

Due to the properties of the resonator, the magnetic field 12 emitted by the object 11 is delayed with respect to the exciting electromagnetic 10 field by a time corresponding to a phase shift of 90° (π/2) if the resonator is tuned to the frequency of the exciting electromagnetic field 10. This stimulation of the emission of a magnetic field 12 is also utilized in Radio Frequency Identification systems (RFID) in order to transmit information from objects not having embodied own energy sources. In RFID, the excited emission of a magnetic field 12 as illustrated in FIG. 2 is also known as "backscattering". The backscattered or emitted magnetic field 12 of the object 11 is, amongst others, received by the loop antenna 4c which is mounted behind a goal post or a bar 18 of a goal. While the loop antennas 4a-d of the antenna systems illustrated in the Figs. do only comprise one single antenna loop formed by a conductor, further examples may also utilize loop antennas having more loops. FIG. 3 illustrates an idealized phase relation between an excitation signal 28 used to generate the exciting electromagnetic field 10 and a receive signal 29 as it may be received at a signal terminal of the loop antenna 4c.

Utilizing an object 11 as, for example the one illustrated in FIG. 10 leads to a field configuration of the magnetic field 12 emitted by the object 11 as illustrated in FIG. 2. This is due to the cause that the individual electromagnetic fields emitted by the three loop antennas 14a-c superimpose with each other such as to arrive at the field configuration of FIG. 2. One exemplary field strength vector 20 of the emitted magnetic field 12 is illustrated in FIG. 2, which is composed of a first component 20a in parallel to the detection plane 22 as well as of a second component 20b perpendicular to the detection plane 22. Due to its orientation, the loop antenna 4c is sensitive to the first component 20a, which is, therefore, also denoted as the goal line part, whereas the second component 20b is also denoted as the frame part of the field strength vector 20 ($H_{back,ball}$).

In other words, the backscatter signal of the object 11 or the ball is inducing a current into the loop antenna 4c and the further loop antenna 6c of the antenna system 2c. The signal within the loop antenna 4c (caused by the first component of the field strength vector 20) is subsequently evaluated as the receive signal to determine the information on the position of the object. The further loop antenna 6c, therefore, is only illustrated schematically and for the sake of completeness in FIG. 2. The backscattered or received signal can be split into a frame part 20b and a goal line part 20a. Depending on the position of the ball, the orientation of the H-field vector 20 of the backscatter signal is changing. As soon as the ball is passing the detection plane 22 at the center of the loop antenna 4c, the first component 20a of the field strength vector ($H_{back,goal}$) is crossing zero and the signal waveform is inverted. That is, a phase condition of the receive signal changes according to a predetermined condition. The predetermined condition is, according to the example of FIGS. 2 to 6, that the signal waveform is inverted and that the phase undergoes a change of 180°. Once a phase inversion or a phase shift of 180° occurs or is determined by evaluation of the receive signal provided by the antenna system 2c, in particular by the loop antenna 4c, a goal could in principle be assumed, since the center of the ball or of the object 11 crossed the line of symmetry of the two signal paths of the loop antenna 4c, that is the detection plane 22. At the time of the crossing, the overall field strength of the exciting electromagnetic field 12 is at maximum and, therefore, the emission of the magnetic field 12 of the object is maintained, increasing the achievable precision in the determination of the transit of the object 11 as compared to alternative approaches, where the exciting electromagnetic field within the detection plane 10 is tuned or adjusted to be zero.

However, at the presence of unavoidable disturbing objects, the accuracy of the determination of the crossing of the object may not be high enough, since the disturbing objects themselves may cause a magnetic field in parallel to the first component 20a of the field strength vector, so potentially falsifying the simple determination of the crossing of the ball according to the previously described approach.

According to the embodiments to determine information on the position of the object subsequently described in connection with FIGS. 8 to 10, the information on the position of the object may be determined even at the presence of disturbing objects. The determination may be based on the receive signals received or monitored by means of the loop antennas of the example configurations illustrated in FIGS. 1 to 6.

Figure 4:
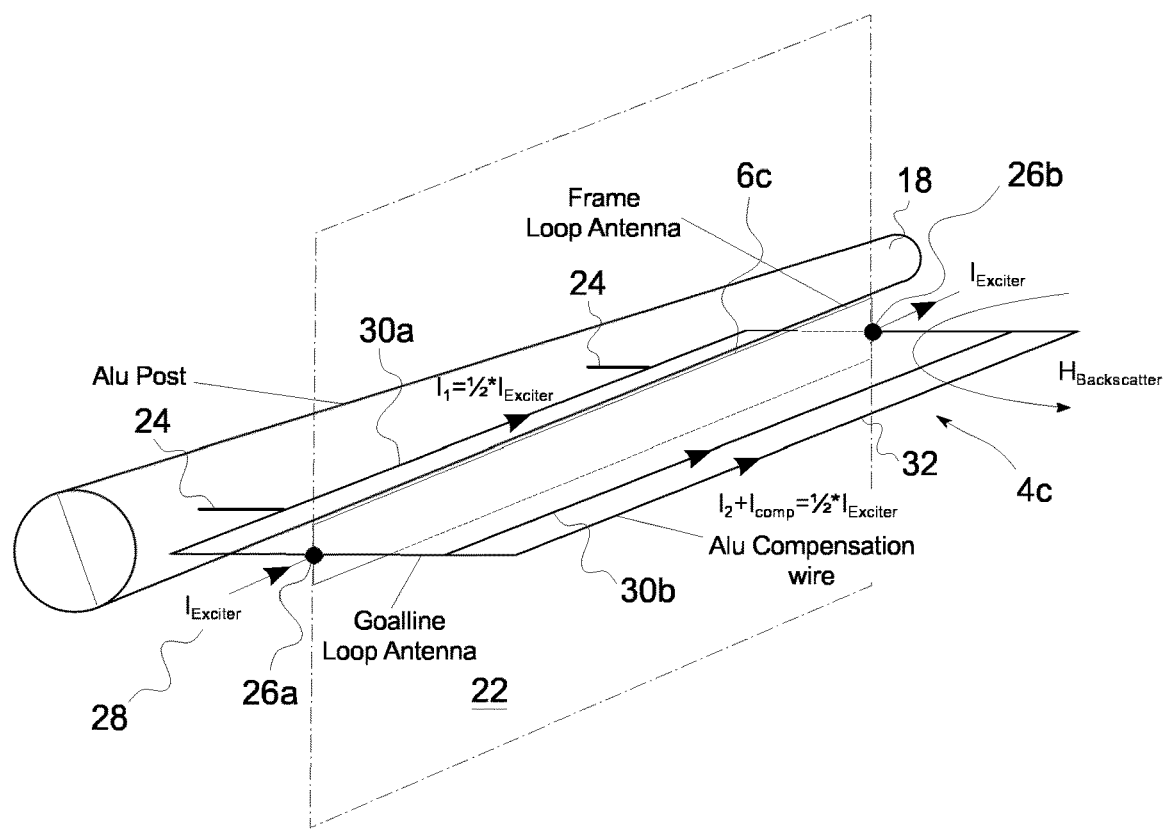
FIG. 4 shows a perspective view of an example of an antenna system usable to monitor receive signals.

For the detection of a goal in a soccer game, the antenna system 4c may comprise a mounting structure operable to mount the antenna system to a support structure or to the goal such that the detection plane 22 has a distance equaling half a diameter of a soccer ball to the front face of the goal. In order to provide a more flexible solution, the mounting structure may be adjustable to fit different designs of goals, such as to be able to adjust the predetermined distance to the requirements. FIG. 4 shows a perspective view of the configuration illustrated in FIG. 2, wherein an example of a mounting structure 24 adapted to mount the antenna system comprising the loop antenna 4c and the further loop antenna 6c to the aluminum bar 18 of a goal is illustrated schematically.

As further illustrated in FIG. 4, the loop antenna 4c comprises a first terminal 26a and a second terminal 26b in order to receive the excitation signal 28 for the loop antenna 4c, which allows providing said excitation signal 28 to the loop antenna. As illustrated in more detail in FIG. 4, the excitation signal 28 of alternating current is split and transferred (propagates) from the first terminal 26a to the second terminal 26b via a first signal path 30a as well as via a second signal path 30b. That is, both conductors of the loop antenna 4c which extend in parallel to the detection plane 22 participate in the generation of the exciting electromagnetic field 10. According to the example of FIG. 4, the further loop antenna 6c, that is, the frame antenna, does not participate in the generation of the electromagnetic field 10. However, further examples may also utilize the further loop antenna 6c for the generation of the exciting electromagnetic field 10.

FIG. 4 further illustrates a compensation signal path 32, which is coupled to the second signal path 30b and which serves to balance the loop antenna 4c. In alternative examples, the compensation signal path 32 may, of course, also be coupled to the first signal path 30a. The compensation signal path 32 has adjustable coupling characteristics with respect to the second signal path 30b. This may be utilized to compensate for field components generated by eddy currents in metallic posts such as for example in the aluminum post 18 illustrated in FIG. 4. The eddy currents may, for example, be generated by the current in the first signal path 30a and, hence, induce a current into the loop antenna 4c which is not caused by the object and, therefore, undesirable. By means of the compensation signal path 32, or, more generally, by using a compensation signal generator within the antenna system 2c, such signal components may be compensated so that the antenna is balanced, that is, one of the signal paths 30a or 30b carries half of the current of the excitation signal 28, while the other signal path, possibly together with the compensation signal path 32 or with the compensation signal generator carries the other half of the current, such that no signal as induced in the loop antenna 4c without the presence of the object 11 in the proximity of the loop antenna 4c. To this end, the loop antenna is tuned such that the both signals carrying half of the current each are in phase.

FIG. 4 shows one particular possibility to implement a compensation signal generator by using a compensation wire having an adjustable distance to the wire of the second signal path 30b and/or an adjustable inductance so that the antenna can be balanced by adjusting the distance and/or the inductance once the antenna is mounted to the support structure or to the goal. A further possibility to implement a compensation signal generator would, for example, be to add a symmetric metal or aluminum part on the other side of the antenna system 2c such as to provide a symmetric configuration in which the eddy currents of the different metal bars compensate each other. A further possibility to implement a compensation signal generator would, for example, be to induce a current into the loop antenna 4c or into one signal path of the loop antenna 4c with an appropriately adjusted amplitude and phase generated such that the influence of the eddy current is compensated for. The induction of this additional compensation signal could, for example, be performed by means of a further transformer or the like. However, when using a compensation signal path 32 or a compensation wire as illustrated in FIG. 4, and, in more detail in FIG. 5, no further active signal path is necessary and, hence, the antenna system remains simple and reliable.

Apart from the use of the compensation signal generator or the compensation signal path 32, the antenna system design is also highly efficient in avoiding cross-talk or undesired signal components as compared to other solutions employing an additional independent loop for the generation of the exciting electromagnetic field 10. Using an additional loop may generate cross-talk signals in the loop antenna 4c of the antenna system 2c which might cover the magnetic field 12 of the backscatter signal of the object 11. This would decrease the accuracy of the detection of the occurrence of a goal significantly. However, utilizing the loop antenna to create the exciting electromagnetic field as in the examples described in the Figs. avoids the occurrence of cross-talk signals due to the particular generation of the exciting electromagnetic field 10.

Figure 5:
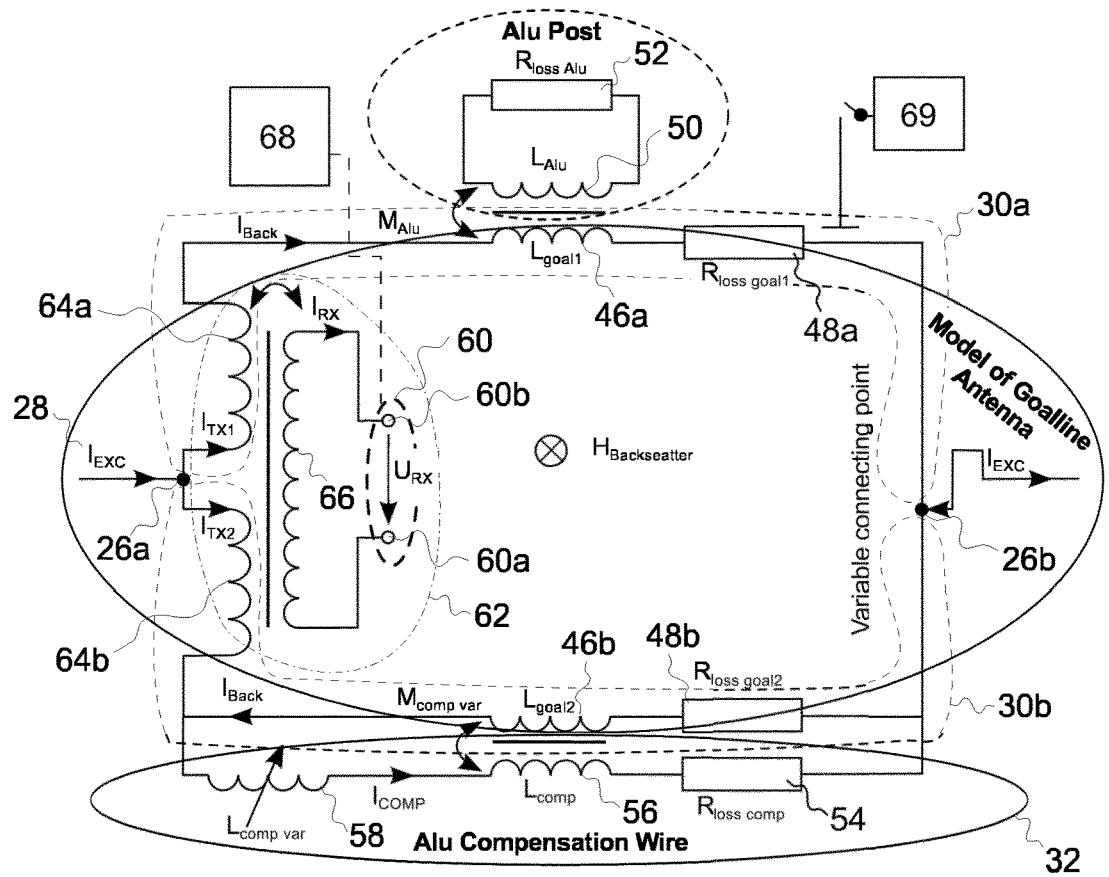
FIG. 5 shows a circuit diagram of an example of an antenna system.
Figure 6:
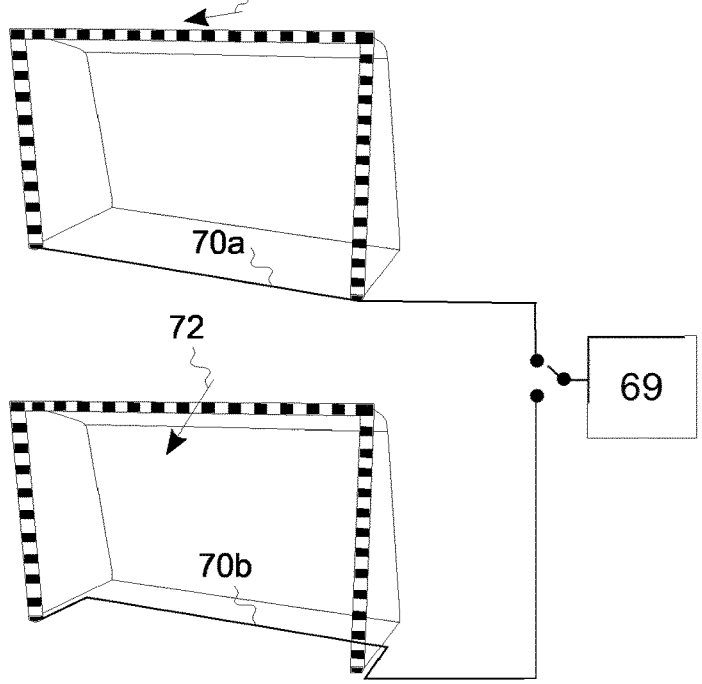
FIG. 6 shows an implementation of a calibration signal generator for generating a calibration signal.

FIG. 5 shows a circuit diagram of an example of an antenna system. For the simplicity of the illustration, only the loop antenna 4c is illustrated in FIG. 5, while the further loop antenna 6c, that is the frame antenna, is not shown, since this antenna need not be balanced or compensated with the same precision as the goal line antenna 4c. The loop antenna comprises the first signal path 30a and the second signal path 30b. The transmission properties of the first and second signal paths 30a and 30b are illustrated by corresponding first and second inductances 46a and 46b as well as by corresponding first and second resistances 48a and 48b. As already mentioned before, the excitation signal 28 is split at the first terminal 26a such as to utilize both signal paths 30a and 30b for the generation of the exciting electromagnetic field 10. The signal of both signal paths 30a and 30b is summed up at the second terminal 26b where the current source providing the excitation signal 28 connects. The influence of metallic post of a goal or the like is modelled by the inductive coupling between an inductance 50 of the aluminum post which is connected in series to an associated resistance 52. In order to compensate for the influence of the post the antenna system illustrated in FIG. 5 incorporates a compensation signal path 32, connected in parallel to the second signal path 30b. The compensation signal path 32 has associated thereto an inherent resistance 54 and an inherent inductance 56. A distance between the compensation signal path 32 and the second signal path 30b may, according to some examples, be adjustable in order to compensate for the influence of the eddy currents in the aluminum post. According to further examples, the compensation signal path 32 may furthermore comprise a variable inductance 58, such as to be able to compensate the influence of the aluminum post or of other influences more precisely. In other words, an additional wire may be used, which is running or extending in parallel to the second signal path 30b of the antenna loop 4c and which builds a coupling circuit ($L_{goal2}$, $L_{comp}$, $M_{com,var}$). By changing the distance between the compensation wire and the antenna loop 4c, the coupling factor $M_{comp,var}$ can be adjusted. In addition or alternatively, a variable inductor 58 or a variable capacitance may be implemented into the compensation path 32. The two variable elements $L_{comp,var}$ and $M_{comp,var}$ may be tuned in a way that both sides of the loop, that is, the first signal path 30a at the first side of the detection plane 22 and the second signal path 30b in combination with the compensation signal path 32 at the opposite side of the detection plane 22 are balanced. That is, in the balanced situation, $I_{TX1}=I_{TX2}=\frac{1}{2}*I_{exc}$, with the current signals being in phase.

The loop antenna 4c furthermore comprises a signal terminal 60 comprising a first signal terminal 60a and a second signal terminal 60b in order to provide the receive signal of the loop antenna 4c. The receive signal is coupled out of the loop antenna 4c by means of a transformer 62. The transformer 62 is formed by a first coil 64a and a second coil 64b as well as by a third coil 66. The first coil 64a is part of the first signal path 30a and the second coil 64b is part of the second signal path 30b, wherein the first terminal 28 is situated between the first and second coils 64a and 64b. The first and second coils 64a and 64b are, however, wound with different orientations, that is, the third coil 66 is coupled to the first and second coils 64a and 64b such that essentially no current is induced in the third coil 66 when the current through the first and second coils 64a and 64b is essentially equal, that is, when the antenna is balanced. Therefore, in the situation of a balanced antenna, no current is induced in the third coil 66 and hence no significant receive signal is provided at the first and second signal terminals 60a and 60b when the object is not present or close.

In order to be able to perform the above discrimination of the receive signal 29 and hence the determination of a transit of the ball 11 through the detection plane 22, however, knowledge on a phase relation between the excitation signal 28 and a receive signal 29 as provided at the signal terminals 60a and 60b may be desirable. Arbitrary amplitude and phase distortion may be employed due to a delay in the antenna cables or in the receiving path of a receiver coupled to the signal terminal 60. These may need to be compensated. In the desirable configuration of a fully-balanced antenna system, however, no signal is present at the signal terminals 60a and 60b which may be utilized for the determination of the phase relation.

In order to provide for the possibility of such a calibration, further examples of the present invention optionally comprise a calibration signal generator 69 which is operable to modify the characteristics of the antenna system such that a signal is generated at the signal terminals 60a and 60b.

According to some examples, this may be achieved by switchable tuning elements in one of the first or the second signal paths 30a or 30b to intentionally bring the antenna out of balance. Examples of those tuning elements may be additional inductors or coupling elements which can be switched on and off by means of relays or transistor circuits. That is, according to some examples, the calibration signal generator 69 may comprise a calibration circuit being coupleable to the first or the second signal path 30a or 30b on demand.

According to another example, the calibration signal generator 69 allows to change the configuration of the circuitry used to generate the exciting electromagnetic field 10 such that the changed exciting electromagnetic field 10 induces a minor amount of current into the loop antenna 4c and, optionally, also in the further loop antenna 6c (the frame antenna). Different exciter loop configurations may be changed by means of a relay or transistor circuitry, which is capable of switching between at least two different configurations. According to the example of FIG. 6, the calibration signal generator 69 is operable to select one of two different ground loop signal paths 70a and 70b. In the configuration of the first ground loop signal path 70a, the field vector 72 of the magnetic component of the exciting electromagnetic field 10 as created by the loop antenna 4c is, at the detection plane 22, perpendicular to said detection plane 22 and, therefore, no signal is induced into a balanced loop antenna 4c. In the second configuration, as illustrated in the lower illustration of FIG. 6, however, a second ground loop signal path 70b is chosen such that the field vector 72 is slightly inclined and, hence, a signal is induced in the loop antenna 4c. The so induced signal may be utilized to determine the phase relation between the exciting signal 28 and the receive signal 29.

The antenna system of FIG. 5 further comprises a signal evaluation processor 68 coupled to signal terminal 60 of the antenna system to monitor the receive signal and to determine information on the position of the object and/or on the transit of the object through the detection plane 22.

Figure 7:
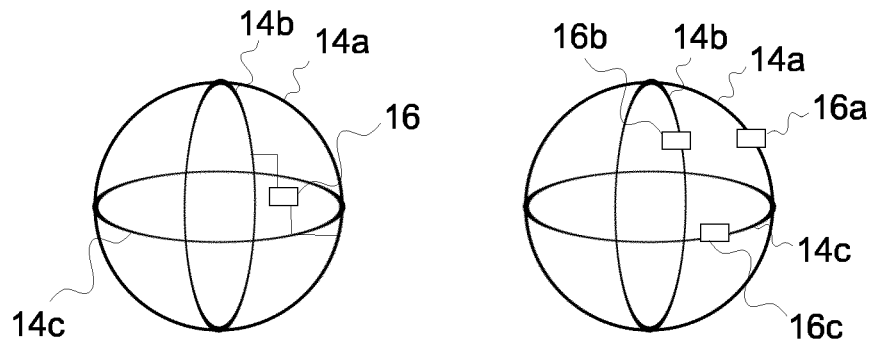
FIG. 7 shows an embodiment of a sports equipment operable to emit an electromagnetic field according to the present invention.

FIG. 7 shows an example of sports equipment or a sensor configuration to be used with an antenna system as previously described and which emits a magnetic field 12 used to determine the transit of the sports equipment through the detection plane 22 or to localize the object illustrated in FIG. 7 in space. The object or sports equipment of FIG. 7 comprises three pairwise perpendicular antenna loops 14a to 14c which are connected in series with a resonator or oscillating circuit 16 having a resonance frequency corresponding essentially to the frequency of an exciting electromagnetic field 10. According to some embodiments, the resonance frequency is within the range of 10 kHz to 300 kHz or, preferably, in the range of 30 kHz to 200 kHz, such as to use electromagnetic fields not being disturbed by the presence of human beings, animals or other living creatures so that a reliable detection of a goal or the object may be performed, even when the area of the goal is crowded with soccer players or other people. While FIG. 7 illustrates a ball for a soccer game as an object to be localized, further embodiments may also use other sports equipment comprising antenna loops and an associated oscillating circuit 16. For example, hockey balls, ice hockey pucks or handballs may be objects to be localized in further embodiments. In some examples, such as for example objects being not point symmetric, the coils may not necessarily be of the same size and/or the oscillating circuits of the different coils may be tuned to different frequencies to allow to distinguish the magnetic field emitted by the different coils from one another.

With respect to FIGS. 8 to 10 it will subsequently be explained how some embodiments determine information on a position of an object based on a receive signal, which may, for example, be generated as elaborated on in the preceding paragraphs.

Figure 8:
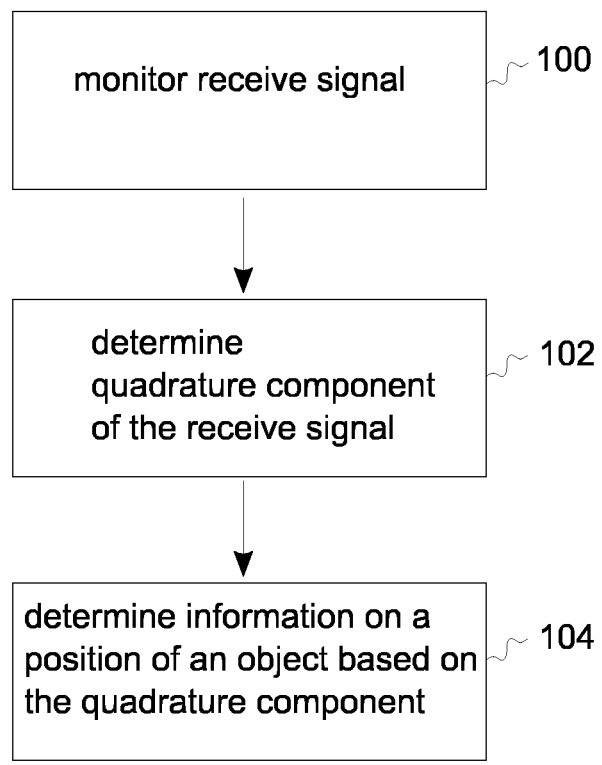
FIG. 8 shows a flow chart of an embodiment of a method for determining information on a position of an object.

FIG. 8 illustrates a flow chart of an embodiment of a method for determining information on a position of an object. The method may, for example, be performed by signal evaluation processor 68.

In order to determine the information on the position of the object, the receive signal is monitored 100 and a first quadrature component of the receive signal is determined in step 102. The information on the position of the object is determined in step 104 based on the first quadrature component. In using the quadrature component (Q-component) of the receive signal as opposed to both, the quadrature and the in-phase component (I-component), signal contributions of disturbing objects can be suppressed or even eliminated, as illustrated by means FIG. 9.

Figure 9:
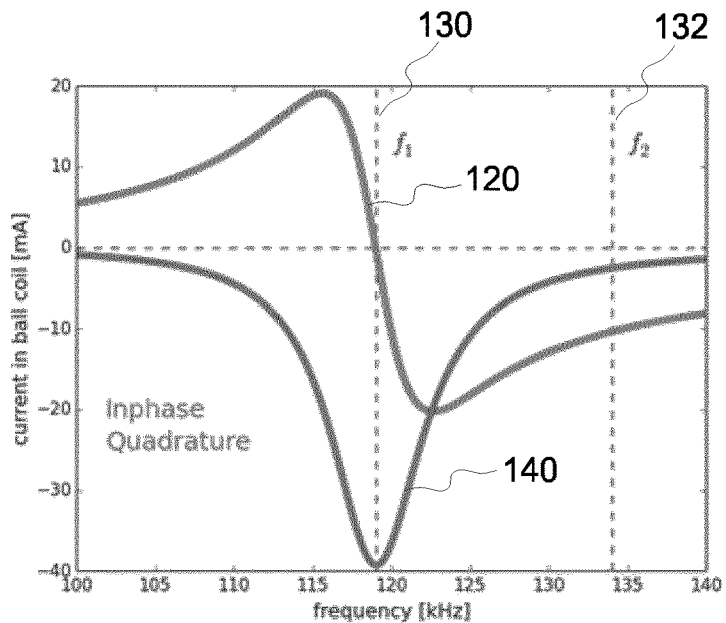
FIG. 9 illustrates a signal characteristic of a receive signal used to determine the information on the position of the object.

FIG. 9 illustrates the current generated within the object illustrated in FIG. 7 as a function of the frequency of the exciting magnetic field. The oscillation circuit within the object is tuned to a resonance frequency corresponding to the first frequency of 119 kHz. The first graph of FIG. 9 illustrates the in-phase component 120 of the current while the second graph illustrates the quadrature component 140 of the current. The Q-component 140 is maximum when the oscillation circuit is excited at its resonance frequency while the I-component is zero. When exciting an oscillating circuit of the object at a first frequency equal to the resonance frequency of the object, the object emits a magnetic field with a phase shift of 90 degree with respect to the exciting electromagnetic field. In this context it is worth noting that the in-phase and quadrature components are to be understood with respect to phase condition of the exciting magnetic field, which is to the phase of a current in a coil generating said field. In other words, the I-component 120 of the current of FIG. 9 has an identical phase as the exciting electromagnetic field or the current generating said field.

The emitted magnetic field if the object directly couples into the receive antenna so that no further phase shifts apply. The contribution of the emitted magnetic field of the object to the receive signal is, therefore, maximum in the Q-component of the receive signal. Ideally the contribution of the I-component would be zero. However, minor imperfections of the system may also lead to smaller contribution of the I-component. One possibility to determine the I-component and the Q-component of the receive signal is to downmix the receive signal using the signal that is used to generate the exciting magnetic field as an Local Oscillator (LO) Signal. Both, the I-Component and the Q-component are then constituting a complex valued receive signal. The complex valued representation of the receive signal is another representation of the receive signal and the processing of the receive signal may be based on both, the directly received signal or on its complex valued representation.

FIG. 9 further illustrates that the Q-component of a current generated in an object rapidly decreases when the frequency of the exiting magnetic field veers away from the resonance frequency of the object. For example, at an excitation with the second frequency 132 of 134 kHz, the Q-component 140 of the current is almost negligibly small when compared to the Q-component of an excitation at resonance frequency. Disturbing objects that may also be excited by the exciting magnetic field (for example developing eddy current) do only contribute to a small amount of the Q-component of the receive signal and mostly contribute to the I-component. Using the Q-component of the receive signal to determine the information on the position of the object may hence result with highly accurate localizations since the contributions of unwanted yet unavoidable disturbing objects are suppressed. Even dynamically occurring disturbing objects are considered, since the monitored receive signal predominantly has a contribution from the object within the quadrature component (Q-component) of the receive signal.

According to some embodiments, some characteristics of the receiving loop antenna are compensated to further increase the accuracy of the measurement.

According to some embodiments, a nulling signal is subtracted from the receive signal. The nulling signal is indicative of a characteristic of the loop antenna without receiving the emitted magnetic field of the object. The nulling signal can be measured while the exciting magnetic field is generated but without the presence of an object to be located. The receive signal may then comprise contributions from direct coupling between an exciting antenna loop used to generate the exciting magnetic field and the receiving loop antenna or from static interferers or disturbing objects. In subtracting the nulling signal, these contributions may be suppressed.

According to further embodiments, the method comprises compensating a phase and amplitude characteristic of the loop antenna within the receive signal. Considering the individual phase and amplitude characteristic of a loop antenna and eventually its associated signal processing chain may further increase the positioning accuracy.

The amplitude and phase characteristic may be determined by a calibration object or by an actively emitting calibration loop emitting a magnetic calibration field with constant phase relation to the exciting electromagnetic field. Measuring the calibration field with the loop antenna and determining it's measured amplitude and phase allows to compensate undesired damping and phase alterations of the antenna loop presently calibrated. According to some embodiments, compensating the amplitude and phase characteristic comprises dividing the samples of a complex valued receive signal by a complex valued calibration signal. The complex valued calibration signal may be determined by dividing the measured complex valued signal by the expected complex valued signal at the presence of the calibrating magnetic field.

Calibrations of the antenna may, for example, be important when the information of multiple loop antennas is combined to conclude on a position of the object, for example in an approach relying on fingerprinting.

FIG. 10 illustrates a flowchart of a further embodiment of a method for determining information on a position of an object that is excited using two frequencies to generate the exciting electromagnetic field. This may be achieved by operating the exciter loop with two frequencies, either simultaneously or alternatingly. That is, the oscillating circuit of the object is excited at a first frequency to emit the magnetic field and the oscillating circuit of the object is excited at a second frequency to emit the magnetic field. The first frequency 130 corresponds to the resonance frequency of the oscillating circuit of the object and the second frequency 132 has an appropriate distance, for example being more than 5% or more than 10% of the first frequency apart from the first frequency. Another way to determine an appropriate distance is to assure that the Q-component within the receive signal received while exciting the object at the second frequency is smaller than a predetermined fraction of the Q component received while exciting the object at the first frequency. According to some embodiments, the predetermined fraction is chosen to be 70%, 50%, 30%, 10% or less.

The method according to the embodiment illustrated in FIG. 10 comprises determining the first quadrature component 160 of the receive signal at a first frequency and determining a second quadrature component of the receive signal at a second frequency 162. The determination of the information on the position of the object uses both, the first quadrature component and the second quadrature component. Disturbing objects generate a nearly identical contribution to both, the first Q-component and the second Q-component, while the object contributes predominantly to the first Q-component. Similar to the embodiment illustrated in FIG. 8, a way to derive the first Q-component may be to downmix the receive signal using the signal of the first frequency that is used to generate the exciting magnetic field as an Local Oscillator (LO) Signal and to likewise downmix the receive signal using the signal of the second frequency to receive the second Q-component.

The method further comprises determining a corrected quadrature component 164 by subtracting the second Q-component from the first Q-component, which cancels the contributions of all disturbing objects to a great extent. The information on the position of the object is determined based on the corrected Q-component having only little contributions of disturbing objects, which may, therefore, provided for a good localization result.

It should be noted that subtracting is only one particular way to decrease the contributions caused by disturbing objects within the receive signal based on the two measurements. Other embodiments may determine the information on the position of the object using the first quadrature component and the second quadrature component by other means while achieving similar or equal results.

In some embodiments, the method further comprises scaling the first quadrature component or the second quadrature component by a scaling factor. Scaling at least one of the two Q-components may consider that the receive signal is depending on the derivative of the Magnetic flux through the loop antenna and, therefore, contributions to the receive signal are higher for higher frequencies. Considering this observation by means of an appropriate scaling factor may increase the extent of the cancellation of the contribution of the disturbing objects.

Some embodiments may further correct for long term drifts of the system. According to those embodiments, a change of the corrected quadrature component is determining and evaluated continuously. The change of the corrected quadrature component is corrected if a characteristic of the corrected quadrature component fulfills an error correction criterion. The error criterion serves to distinguish a receive signal caused by an object of interest from a change caused by other effects, such as for example temperature induced long term drifts of the system. It is noted that a previously determined correction is maintained even if the error correction criterion is no longer fulfilled, that is, if an object to be located is present.

According to some embodiments, the corrected quadrature component is minimized if the error correction criterion is fulfilled. This may, for example, be achieved by adjusting a drift term that is subtracted from the complex valued representation of the receive signal.

The error criterion may evaluate different conditions to distinguish a receive signal caused by an object of interest from a change caused by other effects. According to some embodiments, the error correction criterion is fulfilled if the corrected quadrature component is below a threshold. According to some embodiments, the error correction criterion is fulfilled if a gradient of the change of the corrected quadrature component is below a threshold or if both conditions apply at a time.

According to some embodiments, the long-term effects are compensated by direct superposition of a correction signal on the receive signal, that is the compensation is not performed based on the complex valued representations of the receive signal at the different frequencies. To this end, the superimposed correction signal may be phase inverted with respect to the receive signal and exhibit a similar amplitude (deviating, e.g., less than 5% or 10% from the amplitude of the receive signal). According to some embodiments, direct superposition of the correction signal is achieved by superposing the correction signal to the receive signal in the analog domain. The superposition is performed before analog to digital conversion to, e.g., derive the complex valued representation of the receive signal.

Although primarily illustrated and explained with respect to the detection of goals in a soccer match, further examples of the present invention may be utilized in any other scenario where it is desirable to determine information on the position of a movable object or of any kind of object. This may, for example, be any other kind of sports game, such as for example, handball, American football, polo, cricket, hockey, ice hockey or the like. Furthermore, examples may be utilized to track the transportation of movable goods within a warehouse or the like. For example, it may be of interest if a particular shelf of a storage rack holds goods or not or to automatically track when merchandise is transferred from one shelf to another shelf of the rack. In another implementation, examples of antenna systems may be utilized to detect the crossing of joggers or cyclists or other competitors at the start line of a mass sports event or the like.

Further, the previously described examples and embodiments mainly use loop antennas to receive the receive signal. Further embodiments my also use different types of sensors capable to determine magnetic fields for the same purpose, such as for example hall sensors, giant magnetoresistance (GNR) Sensors, tunnel magnetoresistance (TMR) sensors, superconducting quantum interference devices (SQUIDS) or the like.

An example of an antenna system for generating a receive signal for an embodiment of a method for determining information on a position of an object can be characterized as an antenna system (2a-d) for determining the transit of an object (11) through an area of interest within a detection plane (22), the object (11) emitting a magnetic field (12), the antenna system (2a-d) comprising at least one loop antenna (4c) for receiving the electromagnetic field (12), the at least one loop antenna (4c) comprising one or more antenna loops arranged only within an antenna plane, the antenna plane being perpendicular to the detection plane (22); the at least one loop antenna (4c) further comprising a signal terminal (60) for providing a receive signal (44a, 44b), the receive signal (44a, 44b) comprising information on a position of the object (11).

In example 2 of the antenna system (2a-d), the at least one loop antenna (4c) is furthermore operable to emit an exciting electromagnetic field (10), the exciting electromagnetic field (10) exciting the object (11) to the emission of the magnetic field (12).

In example 3, in the antenna system (2a-d) of example 2, the at least one loop antenna (4c) comprises a first terminal (26a) and a second terminal (26b) for receiving an excitation signal (28) to generate the exciting electromagnetic field (10), wherein the excitation signal (28) is transferred from the first terminal (26a) to the second terminal (26b) via a first signal path (30a) and via a different second signal path (30b) of the at least one loop antenna (4c).

In example 4, in the antenna system (2a-d) of example 3, the first signal path (30a) comprises a first conductor segment extending in parallel to the detection plane (22) and wherein the second signal path (30b) comprises a second conductor segment extending in parallel to the detection plane (22).

In example 5, in the antenna system (2a-d) of example 4, the first signal path (30a) and the second signal path (30b) are arranged on different sides of the detection plane (22) and with essentially identical distance to said detection plane (22).

In example 6, in the antenna system (2a-d) of any of examples 3 to 5, the first signal path (30a) and the second signal path (30b) are configured such that the excitation signal (28) propagates from the first terminal (26a) to the second terminal (26b) via the first signal path (30a) and the second signal path (30b) simultaneously and in phase.

In example 7, in the antenna system (2a-d) of any of examples 3 to 6, the first terminal (26a) is situated between a first coil (64a) being part of the first signal path (30a) and a second coil (64b) being part of the second signal path (30b), the first coil (64a) and the second coil (64b) having windings of opposite orientation.

In example 8, in the antenna system (2a-d) of example 7, the first coil (64a) and the second coil (64b) are part of a transformer (62), the transformer (62) further comprising a third coil (66) coupled to the first coil (64a) and the second coil (64b) such that essentially no current is induced in the third coil (66) when the current through the first coil (64a) and the second coil (64b) is essentially equal.

In example 9, in the antenna system (2a-d) of example 8, the signal terminal (60) comprises a first signal terminal (60a) coupled to a first side of the third coil (66) and a second signal terminal (60b) coupled a different second side of the third coil (66) in order to provide the receive signal at the first signal terminal (60a) and the second signal terminal (60b).

In example 10, the antenna system (2a-d) of any of the preceding examples further comprises a compensation signal generator coupled to the loop antenna (4c), wherein the compensation signal generator is operable to compensate differing currents in the first signal path (30a) and in the second signal path (30b) such that the currents in the first signal path (30a) and in the second signal path (30b) become essentially equal.

In example 11, in the antenna system (2a-d) of example 10, the compensation signal generator comprises a compensation signal path (32) with adjustable coupling characteristics, the compensation signal path coupled (32) to one signal path of the first signal path (30a) and the second signal path (30b).

In example 12, in the antenna system (2a-d) of example 11, the compensation signal path (32) comprises a conductor wire being essentially parallel to one signal path of the first signal path (30a) and the second signal path (30b), the conductor wire comprising at least one of an adjustable distance to the one signal path and an adjustable inductance (58) and capacitance.

In example 13, the antenna system (2a-d) of any of the preceding examples further comprises a calibration signal generator (69) operable to modify the characteristics of the antenna system (2a-d) such that a signal is generated at the signal terminal (60).

In example 14, in the antenna system (2a-d) of example 13, the calibration signal generator (69) comprises a calibration circuit, the calibration circuit being coupleable to the first signal path (30a) or the second signal path (30b) such that a characteristic of the respective signal path is altered.

In example 15, in the antenna system (2a-d) of example 13, the calibration signal generator (69) is operable to select one of a first ground loop signal path (70a) and a second ground loop signal path (70b), each ground loop signal path, when selected, closing an electrical circuit between the first terminal (26a) and the second terminal (26b) of the antenna system (2a-d).

In example 16, the antenna system (2a-d) of any of the preceding examples further comprises, at a border of the area of interest, at least one further loop antenna (6c) for receiving the electromagnetic field, the further loop antenna (6c) comprising one or more antenna loops arranged only within a further antenna plane, the further antenna plane being perpendicular to the antenna plane and parallel to the detection plane (22).

In example 17, the antenna system (2a-d) of any of the preceding examples further comprises a signal evaluator (68) coupled to signal terminal (60) of the antenna system (2a-d), the signal evaluator (68) being operable to determine a signal indicative of the object (11) passing through the area of interest when a phase condition of the receive signal (44a, 44b) received at the signal terminal (60) changes according to a predetermined condition.

In example 18, in the antenna system (2a-d) of example 17, the predetermined condition is a phase change of the receive signal (44a, 44b) from positive phase terms to negative phase terms or vice versa.

In example 19, the antenna system (2a-d) of any of the preceding examples further comprises a mounting structure (24) adapted to mount the antenna system (2a-d) to a support structure (18) such, that the detection plane (22) has a predetermined distance to a predetermined position at the support structure (18).

In example 20, in the antenna system (2a-d) of example 18, the support structure is a post or a bar (18) of a soccer goal, wherein the object is a soccer ball (11) and wherein the predetermined distance corresponds to half a diameter of a soccer ball.

An example of a goal for generating a receive signal for an embodiment of a method for determining information on a position of an object can be characterized as having coupled thereto at least one of the antenna systems of any of the preceding examples at a predetermined distance to a goal line.

A first Example of an objects or sport equipment for emitting a magnetic field in response to an exciting electromagnetic field (10), can be characterized as comprising three loop antennas (14a-c) being arranged in pairwise perpendicular orientation with respect to each other, the three loop antennas (14a-c) being coupled to a resonator (16), the resonator (16) having a resonance frequency corresponding essentially to the frequency of the exciting electromagnetic field (10).

In example 2, in the object or sports equipment of the first example, each loop antenna (14a-c) is connected in series or in parallel to an associated capacitance (16a-c) such as to form three independent resonators, each having a resonance frequency corresponding essentially to the frequency of the exciting electromagnetic field (10).

In example 3, in the object or sports equipment of example 1 or 2, the resonance frequency is from the range of 10 kHz to 300 kHz or from the range of 30 kHz to 200 kHz.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and examples of the invention, as well as specific examples thereof, are intended to encompass equivalents thereof.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A method for determining information on a position of an object, the object emitting a magnetic field in response to an exciting electromagnetic field, comprising:
    monitoring a receive signal of at least one loop antenna, the receive signal having a contribution caused by the emitted magnetic field;
    determining a first quadrature component of the receive signal; and
    determining the information on the position of the object based on the first quadrature component and without taking into account an in-phase component of the receive signal.

2. The method of claim 1, further comprising:
subtracting a nulling signal from the receive signal, the nulling signal being indicative of a characteristic of the loop antenna without receiving the emitted magnetic field.

3. The method of claim 1, further comprising:
compensating a phase and amplitude characteristic of the loop antenna within the receive signal.

4. The method of claim 3, wherein compensating the amplitude and phase characteristic comprises dividing the samples of the complex valued receive signal by a complex valued calibration signal.

5. The method of claim 1, further comprising:
determining the first quadrature component of the receive signal at a first frequency;
determining a second quadrature component of the receive signal at a second frequency; and
determining the information on the position of the object using the first quadrature component and the second quadrature component.

6. The method of claim 5, further comprising:
scaling the first quadrature component or the second quadrature component by a scaling factor.

7. The method of claim 6, wherein determining the information on the position of the object comprises subtracting the second quadrature component from the first quadrature component to determine a corrected quadrature component.

8. The method of claim 7, further comprising:
determining a change of the corrected quadrature component; and
compensating the change of the corrected quadrature component if a characteristic of the corrected quadrature component fulfills an error correction criterion.

9. The method of claim 8, wherein compensating the change comprises minimizing the corrected quadrature component.

10. The method of claim 8, wherein the error correction criterion is fulfilled if the corrected quadrature component is below a threshold.

11. The method of claim 8, wherein the error correction criterion is fulfilled if a gradient of the change of the corrected quadrature component is below a threshold.

12. The method of claim 8, wherein compensating the change comprises:
superimposing a correction signal on the receive signal.

13. The method of claim 12, wherein the correction signal is phase inverted with respect to the receive signal.

14. The method of claim 13, wherein an amplitude of the correction signal deviates less than 5% from the amplitude of the receive signal.

15. The method of claim 1, further comprising:
exciting an oscillating circuit of the object at a first frequency to emit the magnetic field.

16. The method of claim 15, further comprising:
exciting the oscillating circuit of the object at a second frequency to emit the magnetic field.

17. The method of claim 15, wherein the first frequency corresponds to a resonance frequency of the oscillating circuit.

18. A computer readable storage medium, containing non-transitory program code, that, when executed, determines information on a position of an object, the object emitting a magnetic field in response to an exciting electromagnetic field, in accordance to the method of claim 1.

19. A signal evaluation processor for determining information on a position of an object, comprising:
a signal input configured to monitor a receive signal, the receive signal being received by at least one loop antenna and having a contribution caused by an emitted magnetic field, the emitted magnetic field being emitted by the object in response to an exciting electromagnetic field;
a signal processing circuit configured to determine a first quadrature component of the receive signal; and
a signal evaluation circuit configured to determine the information on the position of the object based on the first quadrature component and without taking into account an in-phase component of the receive signal.

20. The signal evaluation processor of claim 19, wherein the signal processing circuit is configured to determine the first quadrature component of the receive signal at a first frequency; and to determine a second quadrature component of the receive signal at a second frequency; and wherein the signal evaluation circuit is configured to determine the information on the position of the object using the first quadrature component and the second quadrature component.

* * * * *